Oct. 27, 1959          S. LUBKIN          2,910,667

SERIAL BINARY CODED DECIMAL PULSE TRAIN COMPARATOR

Filed April 22, 1954          4 Sheets-Sheet 1

COMPARATOR 11

INVENTOR.
SAMUEL LUBKIN

BY *S.C. Yuter*

ATTORNEY

Oct. 27, 1959  S. LUBKIN  2,910,667
SERIAL BINARY CODED DECIMAL PULSE TRAIN COMPARATOR
Filed April 22, 1954  4 Sheets-Sheet 3
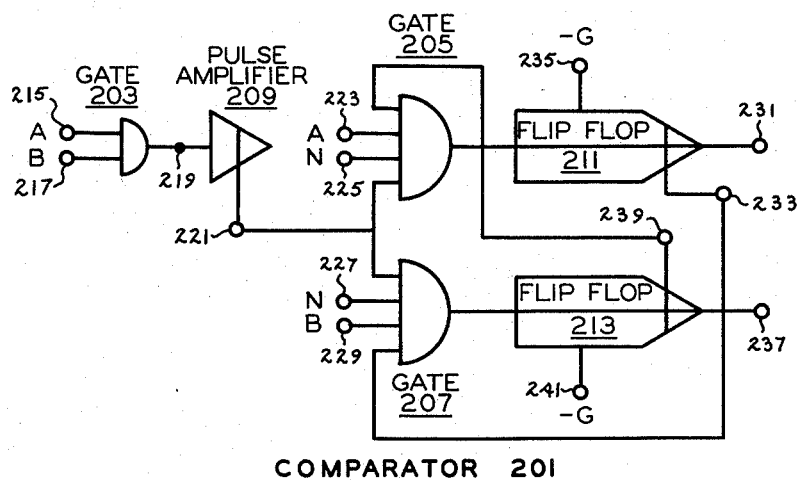
COMPARATOR 201
FIG. 4
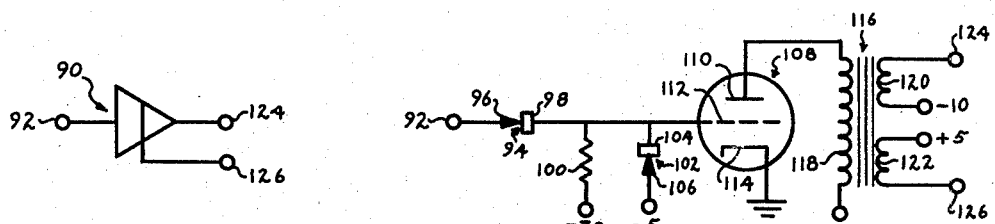
FIG. 13
PULSE AMPLIFIER 90
FIG. 14
INVENTOR.
SAMUEL LUBKIN
BY S.C. Yuter
ATTORNEY.

Oct. 27, 1959  S. LUBKIN  2,910,667
SERIAL BINARY CODED DECIMAL PULSE TRAIN COMPARATOR
Filed April 22, 1954  4 Sheets-Sheet 4
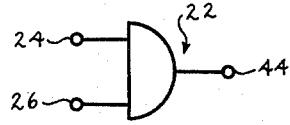
FIG. 5
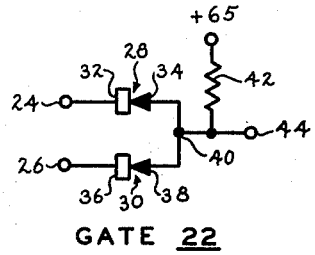
GATE 22
FIG. 6
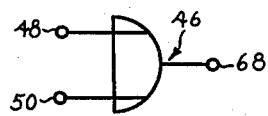
FIG. 7
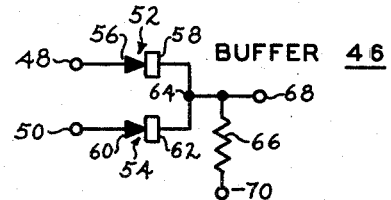
BUFFER 46
FIG. 8
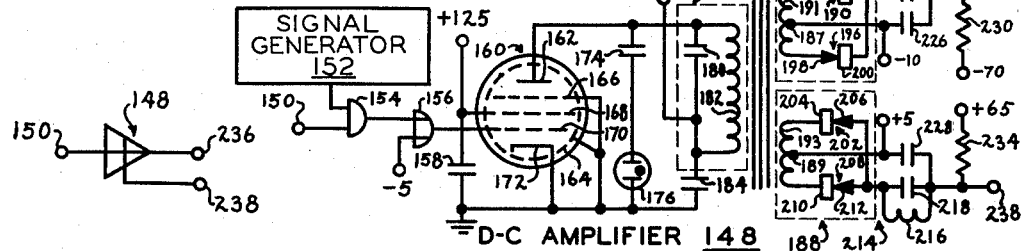
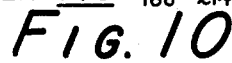
D-C AMPLIFIER 148
FIG. 9    FIG. 10
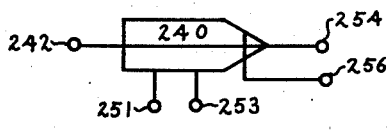
FIG. 11
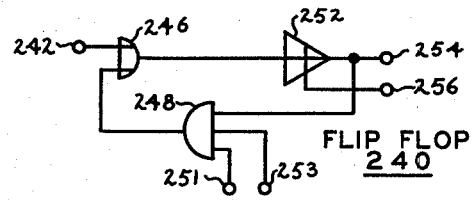
FLIP FLOP 240
FIG. 12
INVENTOR.
SAMUEL LUBKIN
BY  S.C. Yuter
ATTORNEY.

United States Patent Office 2,910,667
Patented Oct. 27, 1959

2,910,667

SERIAL BINARY CODED DECIMAL PULSE TRAIN COMPARATOR

Samuel Lubkin, Brooklyn, N.Y., assignor to Underwood Corporation, New York, N.Y., a corporation of Delaware Application April 22, 1954, Serial No. 425,019

3 Claims. (Cl. 340—149)

This invention relates to information processing and more particularly to apparatus for determining the relationship between items of information.

The determining of the relationship between items of information is an important function which is often performed in data processing. For example, it is frequently necessary to compare numbers to determine whether they are equal or, if not equal, to determine which of the numbers is largest or smallest. Additionally, it is often necessary to compare names or groups of letters to determine their alphabetic order.

A device which performs the function of determining whether items of information are the same or of determining the relative order of significance of the items is commonly known as a comparator.

Comparators generally compare items of information by examining the "characters" by which the items are represented. A character may be a numerical digit, a letter of the alphabet, a punctuation mark, a space, a symbol which may produce a carriage return when transmitted to an electrically operated typewriter, or any similar symbol.

The characters which represent an item of information are usually accorded a degree of significance by virtue of their relative positions in the group of characters which denote the item. Thus, in the number 4395, 5 is the least significant character, 9 is the second least significant character, 3 is the second most significant character, and 4 is the most significant character. In the name Jones, S may be designated as the least significant character and J as the most significant character.

Comparators operate by comparing characters of like significance. Thus, in comparing 4395 to 4874, 5 is compared to 4, 9 to 7, 3 to 8 and 4 to 4. The most significant position in which a difference exists determines the comparative order of significance between the items being compared.

Heretofore, many comparators operated by comparing the characters of items in increasing order of significance, i.e., least significant characters first. Unfortunately in many applications, notably in electronic computers, supplying items to comparators least significant character first is not always convenient and necessitates the inclusion of expensive apparatus to invert the order of significance of the characters.

Accordingly, an object of the invention is to provide an improved comparator.

Another object of the invention is to provide a comparator which avoids the necessity of converting the order of characters of information items when the characters are received in decreasing order of significance.

A further object of the invention is to provide an improved comparator of relatively low cost which can operate at a very high speed.

Briefly, a comparator in accordance with the invention comprises means for receiving signals which represent items of information which contain groups of characters having different degrees of significance. The characters are received in decreasing order of significance. Comparing means are provided which are responsive to the receiving means for comparing the characters of the items most significant character first. The comparison is complete when the first difference between characters of like significance is encountered. An indication of the result is then given by the comparing means.

An advantage of comparators designed in accordance with the invention is the conservation of useful data processing time. This advantage accrues since no time is required for inverting the order of the characters. Additionally, the most significant characters are inspected first so that such comparators need only determine the occurrence of the first inequality. In prior comparators (operating least significant digit first) the items of information required complete comparison to and including the most significant digit in order to positively check for the most significant inequality.

The invention will be more readily understood from the following description and the accompanying drawings in which:

Fig. 4 is a comparator in accordance with a third embodiment of the invention.

Figs. 5 through 12 illustrate the symbols and the circuits represented by these symbols which are employed to illustrate the comparators of Figs. 1 and 3.

Fig. 5 shows the symbol for a gate.

Fig. 6 illustrates the circuit represented by the symbol of Fig. 5.

Fig. 7 shows the symbol for a buffer.

Fig. 8 illustrates the circuit represented by the symbol of Fig. 7.

Fig. 9 shows the symbol for a D.-C. amplifier.

Fig. 10 illustrates the circuit represented by the symbol of Fig. 9.

Fig. 11 shows the symbol for a flip flop.

Fig. 12 is a logical diagram of the circuit represented by the symbol of Fig. 11.

Fig. 13 shows the symbol for a pulse amplifier.

Fig. 14 shows the circuit represented by the symbol of Fig. 13.

Figure 1:
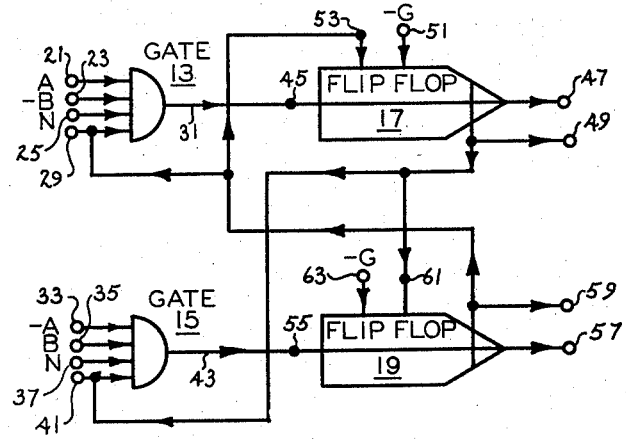
Fig. 1 is a logical diagram of a comparator which compares the characters of information items in accordance with a first embodiment of the invention.

The comparators shown herein as illustrative of the invention are electronic circuits which function to receive and compare signals representative of two items of information. Each of the types of comparators operates by receiving two information items with the serially arranged characters of one item being synchonously disposed to the serially arranged characters of the second item. Thus, each comparator sequentially receives characters of like order of significance from each of the information items to be inspected.

In accordance with the invention, the characters are received most significant character first and in decreasing order of signficance.

Although not specifically limited thereto, the comparators of the invention are especially well-suited for use in electronic digital computers of the data processing type.

Electronic digital computers process information items after the characters have been binarily coded as indicated by Table I. Other codes can be used as, for example, the well known "excess-three" code. Alphabetic characters may be coded in a similar manner.

TABLE I

| Character: | Binary code |
|---|---|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |

The binary code is not an arbitrarily chosen code, but is based upon the binary system which uses the binary digits (or "bits") one and zero. The binary system is a numerical means of expressing a quantity in terms of coefficients of powers of two. For example, the decimal digit 7 is expressed as 111 in the binary system as shown below:

Decimal:
　As used 7
　As understood $7(10)^0$
　Or $7 \times 1 = 7$
Binary:
　As used 111
　as understood $1(2)^2 + 1(2)^1 + 1(2)^0$
　Or $4 + 2 + 1 = 7$ Since the base of this system is two, each coefficient only needs two distinct values, and zero and one are used for this purpose.

As is common to the better-known decimal system, the bits of a binary number possess different degrees of significance in accordance with their relative position in a number. Thus, in Table I, the bit at the right hand side of each number is the least significant bit and the bit at the left hand side of each number is the most significant bit.

Multiple digit decimal numbers may be expressed with the equivalent groups of bits being substituted for each of the decimal digits. The bits of each decimal digit may be arranged in increasing or decreasing order of significance. Thus, the decimal number 85 may be expressed as 10000101 or as 00011010.

Examining an information item most significant character first may be done in two days, namely: (1) examining each of the characters most significant bit first, and (2) examining each of the characters least significant bit first.

The binary system has been adopted because of the ease with which bits can be expressed in an electrical signal. For example, a zero may be expressed by the absence of a pulse and a one by the presence of a pulse. As a specific example, the character 5 (0101) may be represented electrically as follows: no pulse, pulse, no pulse, pulse (most significant bit first); or pulse, no pulse, pulse, no pulse (least significant bit first). The ones may be represented by positive or negative pulses. Normally, a character is binarily coded in terms of positive pulses and the use of negative pulses signifies inverse binary coding.

Normal and inverse coding can be combined in a two voltage-level system wherein the absence of a positive pulse in the normal code is represented by the same potential as is the presence of a negative pulse in the negative code. For example, the voltage used to represent both the absence of a positive pulse in the normal code and the maximum swing of a negative pulse in the negative code may be minus ten volts. A positive pulse in the normal code is represented by the same potential as is the absence of a pulse in the negative code. For example, the voltage used to represent both the maximum swing of a positive pulse in the normal code and the absence of a negative pulse in the inverse code may be plus five volts.

Therefore, an information item composed of a particular combination of positive pulses in normal coding is represented in inverse coding by a signal having a negative pulse corresponding in position to each of the positive pulses.

It should be noted in the description which follows that there is no intrinsic limitation on the speed with which the comparator can respond to the pulses received. For example, the apparatus can easily function in conjunction with circuits which supply pulses at rates in excess of one-hundred thousand pulses per second.

Referring now to the apparatus illustrated in Fig. 1, comparator 11 comprises the gates 13 and 15 and the flip flops 17 and 19. The comparator 11 compares two items of information most significant character first and examines each character most significant bit first.

The gates 13 and 15 (hereinafter described in detail) are coincidence gates, each comprising a crystal diode network which functions to receive input signals via a plurality of input terminals and to pass the most negative signal.

In a two voltage-level system wherein the lower voltage level is a negative potential and the upper voltage level is a positive potential, each of the gates 13 and 15 will pass a positive signal only when all of the input signals to the gate are positive.

The gate 13 includes the input terminals 21, 23, 25 and 29 for receiving input signals. When positive signals are coincident at the input terminals 21, 23, 25 and 29, the gate 13 transmits a positive output signal via the coupling line 31. The gate 13 transmits a negative signal when a negative signal is present at any of the input terminals 21, 23, 25 and 29.

The gate 15 includes the input terminals 33, 35, 37 and 41 for receiving input signals and at the coincidence of positive input signals transmits the resulting positive output signal via the coupling line 43. The gate 15 transmits a negative signal when a negative signal is present at any of the input terminals 33, 35, 37, and 41.

The flip flops 17 and 19 (hereinafter described in greater detail) are bi-stable electronic circuits each having a positive and a negative output terminal. In the two voltage-level system previously mentioned, one of the output terminals, arbitrarily designated the positive output terminal, is maintained at the negative potential level and the other output terminal, designated the negative output terminal, is maintained at the positive potential level to indicate the "reset" state. Upon receipt of a positive signal at the input to the flip flop, the potential levels of the two output terminals are interchanged to indicate the second or "set" stable state.

Once a flip-flop is set it remains set until a negative signal is received via one of a number of "reset" terminals. The reset terminals are normally maintained at a positive potential.

The flip flop 17 includes the input terminal 45, the positive output terminal 47, the negative output terminal 49, and the reset terminals 51 and 53.

The flip flop 19 includes the input terminal 55, the positive output terminal 57, the negative output terminal 59 and the reset terminals 61 and 63.

In the comparator 11, the negative output terminal 49 of the flip flop 17 is connected to the reset terminal 61 of the flip flop 19 and the negative output terminal 59 of the flip flop 19 is connected to the reset terminal 53 of the flip flop 17. The negative output terminals 49 and 59 are also connected to the input terminals 41 and 29, respectively.

In operation, the flip flops 17 and 19 are normally reset so that the input terminals 29 and 41 are at a positive potential. Narrow pulses N, which are positive square-wave pulses having approximately a twenty-five percent duty cycle (see line N of Fig. 2), are continually fed to the input terminals 25 and 37. The narrow pulses N have a repetition rate equal to the repetition rate of pulses in an information signal.

The information signals are received via the remaining input terminals 21, 23, 33 and 35. Since the previously mentioned control signals received via the input terminals 25, 29, 37 and 41 are positive, positive pulses pass through one of the gates 13 and 15 if the information signals received by the gate are coincidentally positive.

Each of the information signals to be compared, hereinafter designated A and B (see Fig. 2) arrive at the gates 13 and 15 most significant bit of the most significant character first, and the remaining portions of the information signals arrive in decreasing order of significance at equal time intervals thereatfer.

More particularly, the gate 13 receives the signal A, representing the normally coded first item of information, via the input terminal 21. The gate 13 receives the signal —B, representing the inversely coded second item of information, via the input terminal 23.

The gate 15 receives the signal —A, representing the inversely coded first item of information, via the input terminal 33, and the signal B, representing the normally coded second item of information, via the input terminal 35.

It will be noted that each of the gates 13 and 15 receive the normally coded representation of one information item and the inversely coded representation of the other information item. Therefore, when there are absences of pulses at a given time in the two information signals, respectively (representing two zeros), the normally coded signals A and B are negative and prevent the gates 13 and 15 from passing positive pulses. Similarly, when there are pulses in both of the information signals, respectively, at a given time (representing two ones), the inversely coded signals —A and —B are negative and prevent the gates 13 and 15 from passing positive pulses. Thus, neither of the gates 13 or 15 can pass a positive pulse when either two ones or two zeros are received simultaneously.

Conversely, when there is an inequality between corresponding bits in the information items to be compared, one of the gates 13 or 15 will pass a positive pulse. More particularly, the gate which receives the normally coded one will pass the positive pulse thus indicating that the normally-coded bit is the larger.

The possible combinations of bits are illustrated in Table II with respect to the operation of the gates 13 and 15.

TABLE II

| Gate 13 Input | | Gate 15 Input | | Gate 13 Output | Gate 15 Output |
|---|---|---|---|---|---|
| A | —B | —A | B | | |
| 1 | 0 | 0 | 1 | Negative | Negative |
| 0 | 1 | 1 | 0 | Negative | Negative |
| 1 | 1 | 0 | 0 | Positive | Negative |
| 0 | 0 | 1 | 1 | Negative | Positive |

Therefore, when the corresponding bits of the information items A and B are not the same, a positive pulse is produced at the output of the gate receiving the larger of the two; that is, the gate receiving the one.

Since only one of the gates 13 and 15 passes a positive pulse at a given time, only one of the flip-flops 17 and 19 can be set at that time.

The set flip-flop produces a positive signal at its positive output terminal and, by virtue of its association with the gate receiving the normally coded representations of a particular information item, indicates the particular item to be the larger.

When examining information items bit by bit in decreasing order of significance, only the most significant inequality must be determined to decide which is the larger item. Therefore, the negative output terminal of the set flip-flop transmits a negative potential to the gate associated with the unset flip-flop and to the reset terminal of the unset flip-flop to prevent later portions of the information signals from changing the initial result.

A negative pulse —G is utilized at the reset terminals 51 and 63 of the flip-flops 17 and 19 to reset the set flip-flop prior to the receipt of the next two information items to be compared.

Figure 2:
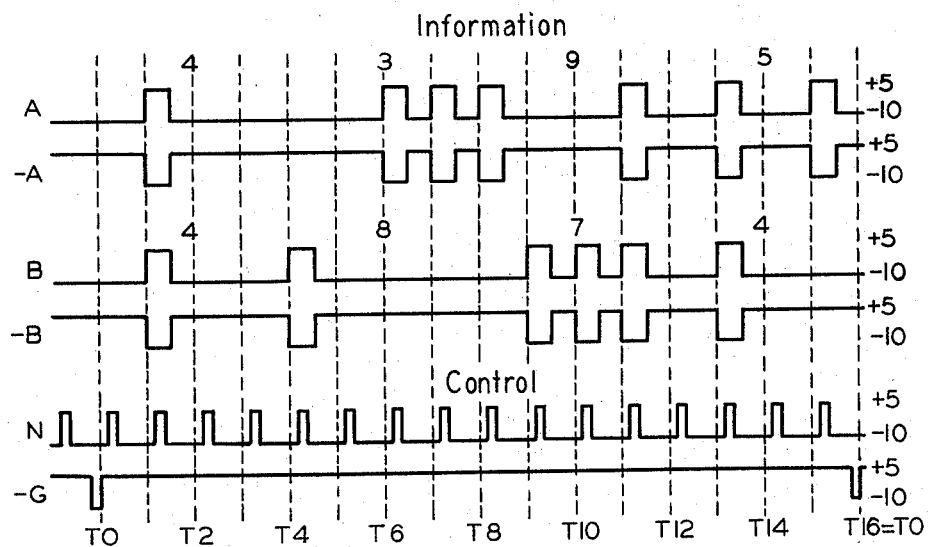
Fig. 2 is a time chart of the signals utilized in the comparator of Fig. 1.

Fig. 2 is a time chart of the signals which are received by the comparator 11 for the purpose of comparing two numbers such as 4395 and 4874. The time chart illustrates the information signals A, —A, B, and —B, and the control signals N, and —G. The signals A and —A represent the number 4395 and the signals B and —B represent the number 4874.

The abscissa of the time chart is divided into time units arbitrarily chosen to equal the time length of a pulse position in which a bit is represented. The designation T indicates the time at which the pulse positions begin. For example, T0 represents the initial time at which the most significant bit of the most significant character of an information signal is received by the comparator 11.

In accordance with inspecting the bits of an information item in decreasing order of significance, the number 4395 is represented with the most significant bit of the most significant character 4 occurring at time T0. Similarly, the most significant bit of the most significant character 4 of the number 4874 is also represented as first appearing at T0. In both cases the most significant bits of the most significant characters are zeros.

The pulses are arbitrarily shown as being square wave pulses having a fifty percent duty cycle. Other wave forms and percentage duty cycles may be used without deviating from the principle of the invention.

Arbitrary voltage levels have also been chosen to illustrate the two voltage level system and are, namely: plus five volts for the higher potential level and minus ten volts for the lower potential level.

The narrow pulses N having a twenty-five percent duty cycle (also arbitrarily selected) are phased so as to be centered timewise during the occurrence of the information pulses representing the items of information.

The negative pulses G are negative square wave pulses occurring at the comparator 11 immediately preceding the receipt of the information signals. The purpose of a negative pulse G, as previously indicated, is to reset the flip-flops 17 and 19 so as to clear them for comparing two new items of information.

Referring again to the signals A, —A, B and —B, it will be noted that in reading the chart from left to right, the most significant bit of the most significant character appears at T0 and bits in decreasing order of significance appear sequentially in the horizontal direction to the right. A graphic illustration of normal and inverse coding of a bit also appears on the chart. For example, the positive and negative pulses occurring respectively in the A and —A signals at T1 are illustrative of normal and inverse coding.

These positive and negative pulses are further illustrative of the practical use of the narrow pulses N. Should, for example, a negative pulse be slightly out of phase with its associated positive pulse, two simultaneous positive potentials would be inadvertently present at one of the gates 13 and 15 for the duration of the phase difference. Likewise, poor rise-times of the positive and negative pulses can cause objectionable voltage spikes to pass through the gates. The inclusion of the narrow pulses N as inputs to the gates 13 and 15 permits the gates 13 and 15 to sample only the central portions of these pulses so that slight phase differences between the pulses or poor rise-times do not cause the gates 13 and 15 to pass positive signals where none is desired.

The operation of the comparator 11 of Fig. 1 while receiving the signals indicated by the time chart of Fig. 2 will next be explained.

Immediately preceding the receipt of information signals, and more particularly immediately prior to T0, negative pulse —G is received in the comparator 11 and is fed to the reset terminals 51 and 63. The negative pulse —G insures that the flip flops 17 and 19 are reset before comparison of the two information items is begun.

At T0, the signal A appears as a negative potential at the input terminal 21 of the gate 13 so that the gate 13 passes a negative signal via the coupling line 31 to the input terminal 45 of the flip flop 17. At the same time, the signal B appears as a negative potential at the input terminal 35 of the gate 15 so that the gate 15 passes a negative potential via the coupling line 43 to the input terminal 55 of the flip flop 19. As a result, from T0 to T1 neither of the flip flops 17 or 19 is set.

At T1, the signal —B appears as a negative potential at the input terminal 23 and prevents the gate 13 from passing a positive signal to the flip flop 17. Simultaneously the signal —A appears as a negative potential at the inpute terminal 33 to prevent the gate 15 from passing a positive signal to the flip flop 19.

Until T4 one of the input terminals 21 and 23 and one of the input terminals 33 and 35 is negative and prevents the gates 13 and 15 from setting the flip flops 17 and 19.

At T4, however, when the first bits representing the second most significant characters are received, the signals appearing at the input terminals 33 and 35 are both positive. The gate 15 passes a positive signal to set the flip flop 19. This indicates that the number 4874 has the larger bit in the most significant position of inequality, and that 4874 is the larger of the two information items.

The positive potential appearing at the positive output terminal 57 of the flip flop 19 indicates that the signal B represents the larger of the two information items.

Additionally, the negative potential which then appears at the negative output terminal 59 is transmitted to the input terminal 29 to block the gate 13 so as to prevent further examination of the signal A. As an additional precaution, the negative potential at the negative output terminal 59 may be sent to the reset terminal 53 of the flip flop 17 to prevent the flip flop 17 from being switched to a set condition. The positive signal remains at the output terminal 57 until just before the beginning of the comparison of the next information items. Then, at time T16 which corresponds to time T0, the flip flop 19 is reset by the reset signal —G.

Thus, the comparator 11 functions to compare two information items bit by bit in decreasing order of significance and indicates which of the information items represented by the signals is the larger.

Figure 3A:
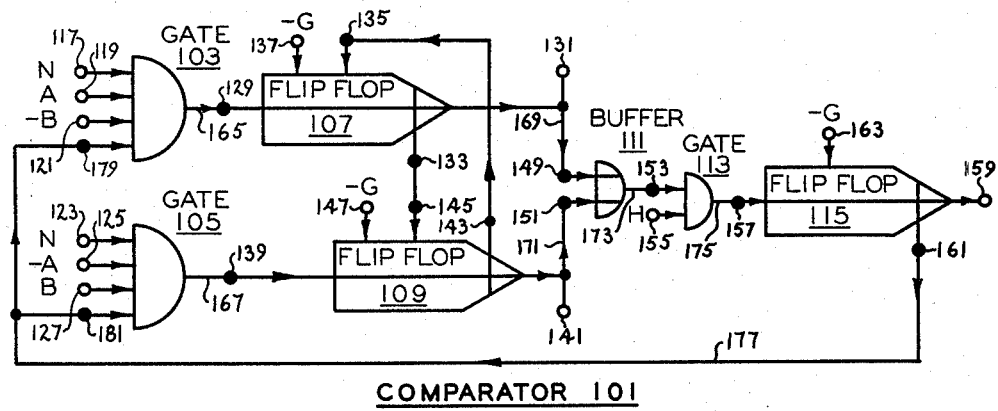
Fig. 3a is a comparator in accordance with a second embodiment of the invention.

Referring to the comparator 101 shown in Fig. 3a, a circuit is symbolically shown which functions to compare two items of information most significant character first but which examines each character least significant bit first.

The comparator 101 comprises the gates 103, 105 and 113, the flip flops 107, 109 and 115 and the buffer 111.

The gates 103, 105 and 113 function as heretofore indicated. The gate 103 includes the input terminals 117, 119, 121 and 179. The gate 105 includes the input terminals 123, 125, 127 and 181. The gate 113 is fed via the input terminals 153 and 155.

The flip flops 107, 109 and 115 function as heretofore described. The flip flop 107 includes the input terminal 129, the positive output terminal 131, the negative output terminal 133 and the reset terminals 135 and 137. The flip flop 109 includes the input terminal 139, the positive output terminal 141, the negative output terminal 143 and the reset terminals 145 and 147. The flip flop 115 includes the input terminal 157, the positive output terminal 159, the negative output terminal 161 and the reset terminal 163.

The buffer 111, also known as an "or" gate, comprises a crystal diode network (as will be described) which functions to receive input signals via a plurality of input terminals and to pass the most positive signal. In a two-voltage system wherein the lower level is a negative potential and the upper level is a positive potential, the buffer 111 will function to pass a positive signal when a positive signal is received via either one of the input terminals 149 or 151.

The gates 103 and 105 are respectively connected by the coupling lines 165 and 167 to the input terminals 129 and 139 of the flip flops 107 and 109. The negative output terminal 133 of the flip flop 107 is coupled to the reset terminal 145 of the flip flop 109 and the negative output terminal 143 of the flip flop 109 is coupled to the reset terminal 135 of the flip flop 107.

The positive output terminals 131 and 141 of the flip flops 107 and 109 are respectively coupled via the coupling lines 169 and 171 to the input terminals 149 and 151 of the buffer 111. The buffer 111 is coupled via the coupling line 173 to the input terminal 153 of the gate 113. The gate 113 receives a signal H via the input terminal 155.

The gate 113 is connected via the coupling line 175 to the input terminal 157 of the flip flop 115.

The negative output terminal 161 of the flip flop 115 is coupled via the feedback line 177 to the input terminal 179 of the gate 103 and to the input terminal 181 of the gate 105.

In operation, the flip flops 107, 109 and 115 are normally reset. The positive potential appearing at the negative output terminal 161 is fed via the feedback line 177 to the input terminals 179 and 181 of the gates 103 and 105, respectively. Narrow pulses N (see Fig. 3b) are fed to the input terminals 117 and 123. The information signals are received via the remaining input terminals 119, 121, 125 and 127 and, due to the previously described signals received by the input terminals 117, 123, 179 and 181, control the passage of positive pulses through the gates 103 and 105.

The information signals arrive at the gates 103 and 105 least significant bit of the most significant character first. The bits representing each character arrive in increasing order of significance at equal time intervals thereafter, the characters arriving in decreasing order of significance.

More particularly, the gate 103 receives the signal A representing the normally coded first item of information via the input terminal 119. The gate 103 receives the signal —B, representing the inversely coded second item of information via the input terminal 121. The gate 105 receives the signal —A, representing the inversely first coded item of information, via the input terminal 125, and the signal B, representing the normally coded second item of information, via the input terminal 127.

It will be noted that each of the gates 103 and 105 receive the normally coded representation of one information item and the inversely coded representation of the other information item. Therefore, when there are absences of pulses at a given time in the two information signals (to represent two zeros), the normally coded signals A and B are negative and prevent the gates 103 and 105 from passing positive signals. Similarly, when there are pulses present in both of the information signals simultaneously (to represent two ones), the signals —A and —B are negative and prevent the gates 103 and 105 from passing positive signals. Thus, neither of the gates 103 and 105 pass a positive signal when either two ones or two zeros are received simultaneously.

Conversely, when there is an inequality between the bits received by the gates 103 and 105, one of the gates 103 and 105 passes a positive signal. More particularly the gate which receives the normally coded one will pass the positive signal thus indicating that the normally coded bit is the larger. The possible combinations are indicated in Table II.

The functions of the flip flops 107 and 109 are to indicate the most significant inequality between bits of like significance in the information items being compared. Since each character is fed to the comparator 101 with its bits arranged in increasing order of significance, the flip flops 107 and 109 must be free to be set and reset until the most significant bits of compared characters have been examined. Thus when the gate 103 passes a positive signal via the coupling line 165 to the input terminal 129 of the flip flop 107, the flip flop 107 is set irrespective of any previously existing condition in the comparator 101. Likewise, the flip flop 109 may be set independently of previously existing conditions. The negative pulses —G received at the reset terminals 137 and 147 are normally absent (leaving a positive potential) so as not to interfere with the setting of the flip flops 107 and 109.

It should be noted that the negative output terminals of each of the flip flops 107 and 109 are interconnected with the reset terminals of the other of the flip flops 107 and 109. Thus, the setting of one of the flip flops 107 and 109 will cause the resetting of the other flip flop. It should be additionally noted, however, that the negative potentials appearing at the reset terminals 135 and 145 do not prevent the associated flip flops from being set, but merely operate to reset a flip flop which has been set.

For example, should the flip flop 109 be set and a negative potential be transmitted via the negative output terminal 143 to the reset terminal 135 of the flip flop 107, the flip flop 107 is reset if it had been previously set. If, subsequently, a positive signal is received by the flip flop 107 via the input terminal 129, the flip flop 107 is set regardless of the negative potential appearing at its reset terminal 135. A negative potential then appears at the negative output terminal 133 and is fed to the reset terminal 145 of the flip flop 109. The flip flop 109 is thereby reset so that a positive potential appears at its negative output terminal 143 and is transmitted to the reset terminal 135 of the flip flop 107. Thus the flip flop 107 may be maintained in its set condition although when a positive potential was received via its input terminal 129, the potential at the reset terminal 135 was negative.

The flip flops 107 and 109 are thus freely permitted to be set by inequalities between bits of information signals received by the comparator 101.

The signals appearing at the positive output terminals 131 and 141 are transmitted via the coupling lines 169 and 171, respectively, to the input terminals 149 and 151 of the buffer 111. When the buffer 111 receives a positive signal, the signal is transmitted via the coupling line 173 to the input terminal 153 of the gate 113. As previously mentioned, the gate 113 receives a signal H via the second input terminal 155.

The signal H (see Fig. 3b) is a positive pulse which occurs following the receipt of the most significant bits of each character by the comparator 101. Thus, since the flip flops 107 and 109 will then be in a condition dictated by the most significant inequality between the bits of the two information signals, the signal H permits a signal indicative of the occurrence of an inequality to be passed through the gate 113 to the input terminal 157 of the flip flop 115 via the coupling line 175. The flip flop 115 receives the signal —G via the reset terminal 163.

When the flip flop 115 is set, a positive signal appears at its positive output terminal 159 and a negative signal appears at its negative terminal 161. The negative signal, which indicates the occurence of an inequality, is transmitted via the feedback line 177 to the input terminals 179 and 181 of the gates 103 and 105, respectively. The presence of a negative signal at the input terminals 179 and 181 blocks the gates 103 and 105 so that further comparison will not be made by the comparator 101. The positive signal remains at the output terminal 159 until just before the beginning of the comparison of the next information items. Then, at time T16 which corresponds to time T0, the flip flop 115 is reset by the reset signal —G.

Thus, the comparator 101 examines the characters of two information items in decreasing order of significance while comparing the bits of these information items in increasing order of significance. Since the flip flops 107 and 109 are free to be set irrespective of previously existing conditions during the examination of each set of characters, the condition existing immediately preceding the receipt of the signal H by the gate 113 indicates which of the two information items is the larger. It should be further noted that when an inequality first occurs between characters (not bits) the comparator 101 ceases to examine the information items which are being received. Thus, the comparator 101 functions to compare two information items whose characters are examined in decreasing order of significance while the bits are being examined in increasing order of significance.

Figure 3B:
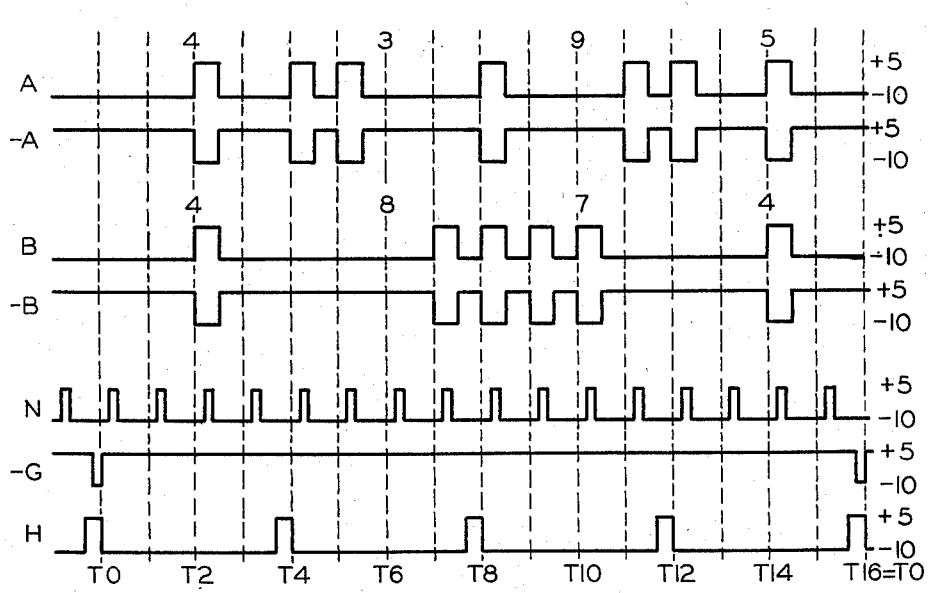
Fig. 3b is a time chart illustrative of the signals utilized in the comparator of Fig. 3.

Fig. 3b is a time chart of the signals which are received by the comparator 101 for the purpose of comparing two numbers such as 4395 and 4874. The time chart illustrates the information signals A, —A, B and —B and the control signals N, —G and H. The signals A and —A represent the number 4395 and the signals B and —B represent the number 4874.

The abscissa of the time chart is divided into time units as previously indicated. T0 represents the initial time at which the least significant bit of the most significant character of an information signal is received by the comparator 101.

In accordance with inspecting the bits of each character in increasing order of significance the number 4395 is represented with the least significant bit of the most significant character 4 occurring at time T0. Similarly, the least significant bit of the most significant character 4 of the number 4875 is also represented as appearing at T0.

As in the time chart of Fig. 2, the information pulses of Fig. 3b are arbitrarily shown as being square wave pulses having fifty percent duty cycle. Other wave forms and percentage duty cycles may be used without deviating from the spirit of the invention.

Fig. 3b illustrates the two voltage-level system used in the comparator 101. Plus five volts is arbitrarily used for the higher potential level and minus ten volts for the lower potential level. The narrow pulses N having a twenty-five percent duty cycle (also arbitrarily selected) are phased so as to be centered timewise during the occurrence of the information pulses representing the bits of the characters. The negative pulses —G are negative square wave pulses having an arbitrarily chosen twenty-five percent duty cycle. The negative pulses —G occur at the comparator 101 immediately preceding the receipt of the information signals and reset the flip flops 107, 109 and 115 to clear them for comparing the two new items of information.

Referring again to the signals A, —A, B and —B, it will be noted in reading the chart from left to right that the least significant bits of the most significant characters appear at T0 and the least significant bits of the succeeding characters (received in decreasing order of significance) appear at T4, T8 and T12.

At T0 and T1 the signal A appears as a negative potential at the input terminal 119 of the gate 103 thereby preventing the gate 103 from passing a positive signal. During the same pulse periods, the signal B appears as a negative potential at the input terminal 127 of the gate 105 so that the gate 105 also transmits a negative potential.

At T2, the signal —B appears at the input terminal 121 as a negative potential so that the gate 103 transmits a negative potential. Simultaneously, the signal —A appears as a negative potential at the input terminal 125 so that the gate 105 passes a negative signal.

At T4, the first inequality occurs and the signals A and —B received by the input terminals 119 and 121 at the gate 103 are simultaneously positive. The gate 103 passes a positive signal to set the flip flop 107. At T5, the gate 103 passes a second positive signal which has no significant effect because the flip flop 107 has been previously set.

At T6, neither of the gates 103 nor 105 passes a positive signal. The flip flop 107, however, remains set because of the absence of a negative reset signal.

At T7, the most significant bits of the second most significant characters are examined. The gate 105 passes a positive signal because the B and —A signals are simultaneously positive. The flip flop 109 is thereby set and produces a positive signal at its positive output terminal 141.

This positive signal is fed via the buffer 111 to the gate 113 which, due to the signal H received via the input terminal 155, passes a positive signal to the flip flop 115 via the coupling line 175. The flip flop 115 is set so that a positive potential appears at the positive output terminal 159 and a negative potential appears at a negative output terminal 161.

The negative potential is transmitted to the input terminals 179 and 181 of the gates 103 and 105, respectively, and prevents further positive signals from being passed through the gates 103 and 105 until the flip flop 115 is reset by the negative pulse —G in time for the comparator 101 to inspect the next two items of information.

Thus, the comparator 101 functions to compare two items of information by inspecting the characters in decreasing order of significance and the bits which represent these characters in increasing order of significance.

Coded alpha-numeric, as well as purely alphabetic information, can also be compared by the apparatus and methods described. One of the various ways in which alphabetic and numeric characters can be coded is illustrated in Table III. It should be noted that six-bit groups are used to provide the number of combinations required to express all of the characters:

TABLE III

| Character | Sequence Position | Binary Code | Character | Sequence Position | Binary Code |
|---|---|---|---|---|---|
| 0 | 0 | 000000 | I | 18 | 010010 |
| 1 | 1 | 000001 | J | 19 | 010011 |
| 2 | 2 | 000010 | K | 20 | 010100 |
| 3 | 3 | 000011 | L | 21 | 010101 |
| 4 | 4 | 000100 | M | 22 | 010110 |
| 5 | 5 | 000101 | N | 23 | 010111 |
| 6 | 6 | 000110 | O | 24 | 011000 |
| 7 | 7 | 000111 | P | 25 | 011001 |
| 8 | 8 | 001000 | Q | 26 | 011010 |
| 9 | 9 | 001001 | R | 27 | 011011 |
| A | 10 | 001010 | S | 28 | 011100 |
| B | 11 | 001011 | T | 29 | 011101 |
| C | 12 | 001100 | U | 30 | 011110 |
| D | 13 | 001101 | V | 31 | 011111 |
| E | 14 | 001110 | W | 32 | 100000 |
| F | 15 | 001111 | X | 33 | 100001 |
| G | 16 | 010000 | Y | 34 | 100010 |
| H | 17 | 010001 | Z | 35 | 100011 |

As an illustration of alphabetic comparison in comparing A (001010) to B (001011), the most significant difference is found in the least significant position and indicates that B follows A in sequence.

With the six-bit code, the comparators 11 and 101 of Figs. 1 and 3a, respectively, operate substantially as has been described. The comparator 101 in this instance, however, requires an H pulse for each sixth bit to retain its ability to detect an inequality after a pair of characters has been examined.

Referring to the comparator 201 shown in Fig. 4, a circuit is shown which compares in a manner similar to that described for the comparator 11; specifically, most significant bits of characters are examined first. The comparator 201, however, does not require an inverted code. It should be noted that this principle, although shown by way of modification of the comparator 11, is equally applicable to the comparator 101.

The comparator 201 comprises the gates 203, 205 and 207, the pulse amplifier 209 and the flip flops 211 and 213.

The gate 203 includes the input terminals 215 and 217 by which are received the signals A and B, respectively. The gate 203 feeds its signals to the input terminal 219 of the pulse amplifier 209.

The pulse amplifier 209 includes the negative output terminal 221. The pulse amplifier 209 produces a positive signal at the negative output terminal 221 except if a positive pulse is received via the input terminal 219. When a positive pulse is received via the input terminal 219, the pulse amplifier 209 produces a negative signal at the negative output terminal 221 for the duration of the positive input pulse.

The negative output terminal 221 is connected to the gates 205 and 207. The gate 205 includes the input terminal 223 by which the signal A is received and the input terminal 225 by which the narrow pulses N are received. The gate 207 includes the input terminal 227 by which the narrow pulses N are received and the input terminal 229 by which the signal B is received.

The signal passed by the gate 205 is fed to the flip flop 211 which includes a positive output terminal 231, a negative output terminal 233 and a reset terminal 235 by which the signal —G is received. The negative output terminal 233 is coupled to an input terminal of the gate 207.

The signal passed by the gate 207 is fed to the flip flop. The flip flop 213 includes a positive output terminal 237, a negative output terminal 239 and a reset terminal 241 by which the signal —G is received. The negative output terminal 239 is connected to an input terminal of the gate 205.

When the flip flop 211 is set and a positive signal appears at the positive output terminal 231, the comparator 201 indicates that A is greater than B. When flip flop 213 is set and a positive signal appears at the positive output terminal 237 the comparator 201 indicates that B is greater than A. Thus the gate 205 must satisfy the condition of passing a positive signal only when A is greater than B and the gate 207 must satisfy the condition of passing a positive signal only when B is greater than A. No signal is passed by either of the gates 205 and 207 when A equals B.

More particularly, when A equals B and both are zeros, negative signals appear at the input terminals 223 and 229 of the gates 205 and 207, respectively, thereby preventing a positive signal from being passed to either of the flip flops 211 and 213. Thus neither of the flip flops 211 or 213 are set.

If A and B are equal and both are ones, the gate 203 passes a positive signal. The positive signal is received by the pulse amplifier 209 which produces a negative signal at its negative output terminal 221 and prevents the gates 205 and 207 from passing a signal to set either of the flip flops 211 and 213.

If A is a one and B is a zero, the gate 203 is blocked by the negative signal present at the input terminal 217. A positive signal therefore appears at the negative output terminal 221. If the negative output terminal 239 is positive, the gate 205 is thus enabled to pass a positive pulse (A being positive) upon the occurrence of a narrow pulse N. The flip flop 211 is thereby set and a positive signal appears at the positive output terminal 231 to indicate that A is greater than B.

If B represents a one and A represents a zero, the gate 203 is blocked and a positive signal appears at the negative output terminal 221. If the negative output terminal 233 is positive, the gate 207 is enabled to pass a positive signal upon the occurrence of a narrow pulse N. The flip flop 213 is thereby set and a positive signal occurs at the positive output terminal 237 to indicate that B is greater than A.

As previously described for the comparator 11, when either of the flip flops 211 and 213 are set, negative signals appear at the negative output terminals 233 or 239 and are fed back to the associated gate 205 or 207 thereby preventing additional positive pulses from being passed. Thus comparison is completed upon the first detection of an inequality by the comparator 201. As has been previously explained, the negative signal —G is utilized to reset the flip flops 211 and 213 to prepare for the comparison of new characters of information items.

Thus in accordance with the invention, comparators have been provided which compare the characters of the items of information in decreasing order of significance. Because of the simple apparatus involved these comparators are of relatively low cost. It should be noted that these comparators can be simply adapted to comparing selected characters of the information items by including additional inhibiting signals.

Description of symbols

The schematic equivalents of the symbols which have been employed to simplify the detailed description of the comparators 11 and 101 will next be described. It should be understood that the circuits described can be replaced by other circuits which perform similar functions.

Gate

The gates used in the comparators are of the "coincidence" type, each comprising a crystal diode network which functions to receive input signals via a plurality of of input terminals and to pass the most negative signal.

The symbol for a representative gate 22, having two input terminals 24 and 26, is shown in Fig. 5. Since the signal potential levels are plus five volts (positive signals) and minus ten volts (negative signals), the potentials of the signals which may exist at the input terminals 24 and 26 are thereby limited.

If a potential of minus ten volts is present at one or both of the input terminals 24 and 26, a potential of minus ten volts exists at the output terminal 44. Therefore, if one of the input signals to the input terminals 24 and 26 is positive and the other signal is negative, the negative signal is passed and the positive signal is "blocked."

When there is a coincidence of positive signals at the two input terminals 24 and 26, a positive signal is transmitted from the output terminal 44. In such case, it may be stated that a positive signal is "gated" or "passed" by the gate 22.

The schematic details of the gate 22 are shown in Fig. 6. Gate 22 includes the crystal diodes 28 and 30. Each of the input terminals 24 and 26 is coupled to one of the crystal diodes 28 and 30. Crystal diode 28 comprises the cathode 32 and the anode 34. Crystal diode 30 comprises the anode 38 and the cathode 36. More particularly, the input terminals 24 and 26 are respectively coupled to the cathode 32 of the crystal diode 28 and the cathode 36 of the crystal diode 30. The anode 34 of the crystal diode 28 and the anode 38 of the crystal diode 30 are interconnected at the junction 40. The anodes 34 and 38 are coupled via the resistor 42 to the positive voltage bus 65.

If negative potentials are simultaneously present at the input terminals 24 and 26, both of the crystal diodes 28 and 30 conduct, since the positive supply bus 65 tends to make the anodes 34 and 38 more positive. The voltage at the junction 40 will then be minus ten volts since, while conducting, the anodes 34 and 38 of the crystal diodes 28 and 30 assume the potential of the associated cathodes 32 and 36.

When a positive signal is fed only to the input terminal 24, the cathode 32 is raised to a positive five volts potential and is made more positive than the anode 34, so that crystal diode 28 stops conducting. As a result, the potential at the junction 40 remains at the negative ten volts level. In a similar manner, when a positive signal is only present at the input terminal 26, the voltage at the junction 40 will not be changed.

When the signals present at both input terminals 24 and 26 are positive, the anodes 34 and 38 are raised to approximately the same potential as their associated cathodes 32 and 36 and the potential at the junction 40 rises to a positive potential of five volts.

The potential which exists at the junction 40 is transmitted from the gate 22 via the connected output terminal 44.

In the above described manner, the gate 22 is frequently used as a switch to govern the passage of one signal by the presence of one or more signals which control the operation of the gate 22.

It should be understood that the potentials of plus five volts and minus ten volts used for purpose of illustration are approximate, and the exact potentials will be affected in two ways. First, they will be affected by the value of the reisstance 42 and its relation to the impedances of the input circuits connected to the input terminals 24 and 26. Second, they will be affected by the fact that a crystal diode has some resistance (i.e., is not a perfect conductor) when its anode is more positive than its cathode, and furthermore will pass some current (i.e., does not have infinite resistance) when its anode is more negative than its cathode. Nevertheless, the assumption that signal potentials are either plus five or minus ten volts is sufficiently accurate to serve as a basis for the description of the operations taking place in the apparatus.

A clamping diode may be connected to the output terminal 44 to prevent the terminal from becoming more negative than a predetermined voltage level to protect the diodes 28 and 30 against excessive back voltages and to provide the proper voltage levels for succeeding circuits.

Buffer

The buffers used in the comparators are also known as "or" gates. Each buffer comprises a crystal diode network which functions to receive input signals via a plurality of input terminals and to pass the most positive signal.

The symbol for a representative buffer 46, having two input terminals 48 and 50, is shown in Fig. 7. Since the signal potential levels in the system are minus ten volts and plus five volts, either one of these potentials may exist at the input terminals 48 and 50.

If a positive potential of five volts exists at one or both of the input terminals 48 or 50, a positive potential of five volts exists at the output terminal 68. If a negative potential of ten volts is present at both of the input terminals 48 and 50, a negative potential of ten volts will be present at the output terminal 68.

The schematic details of the buffer 46 are shown in Fig. 8. The buffer 46 includes the two crystal diodes 52 and 54. The crystal diode 52 comprises the anode 56 and the cathode 58. Crystal diode 54 comprises the anode 60 and the cathode 62. The anode 56 of the crystal diode 52 is coupled to the input terminal 48. The anode 60 of the crystal diode 54 is coupled to the input terminal 50. The cathodes 58 and 62 of the crystal diodes 52 and 54, respectively, are joined at the junction 64 which is coupled to the output terminal 68, and via the resistor 66 to the negative supply bus 70. The negative supply bus 70 tends to make the cathodes 58 and 62 more negative than the anodes 56 and 60, respectively, causing both crystal diodes 52 and 54 to conduct.

When negative ten volt signals are simultaneously present at input terminals 48 and 50, the crystal diodes 52 and 54 are conductive, and the potential at the cathodes 58 and 62 approaches the magnitude of the potential at the anodes 56 and 60. As a result, a negative potential of ten volts appears at the output terminal 68.

If the potential at one of the input terminals 48 or 50 increases to plus five volts, the potential at the junction 64 approaches the positive five volts level as this voltage is passed through the conducting crystal diode 52 or 54 to which the voltage is applied. The other crystal diode 52 or 54 stops conducting since its anode 56 or 60 becomes more negative than the junction 64. As a result, a positive potential of five volts appears at the output terminal 68.

If positive five volt signals are fed simultaneously to both input terminals 48 and 50, a positive potential of five volts appears at the output terminal 68, since both crystal diodes 52 and 54 will remain conducting. Thus the buffer 46 functions to pass the most positive signal received via the input terminals 48 and 50.

D.-C. amplifier

The symbol for a representative D.-C. amplifier 148 is shown in Fig. 9. When a positive signal is present at the input terminal 150, a positive signal of five volts appears at the positive output terminal 236 and a negative signal of ten volts is present at the negative output terminal 238. If a negative potential is present at the input terminal 150, the potentials at the output terminals 236 and 238 are reversed.

As shown in Fig. 10, the D.-C. amplifier 148 includes the gate 154, the buffer 156, the vacuum tube 160, the transformer 183, the full-wave rectifiers 186 and 188, and the filters 220 and 214.

The input terminal 150 is connected to one input terminal of the gate 154. The other input of the gate 154 is fed a one megacycle carrier signal from the signal generator 152 which is a signal generator of known type. The megacycle carrier signal swings from minus ten to plus five volts.

One input of the buffer 156 is connected to the output of the gate 154. The other input of the buffer 156 is connected to the negative supply bus 5. The buffer 156 couples the output of the gate 154 to the control grid 170 of the vacuum tube 160.

The vacuum tube 160 is a five element tube having a grounded cylindrical shield 164, and includes the anode 162 connected via the primary winding 182 of the transformer 183 to a positive supply bus 250. The junction of the positive supply bus 250 and the primary winding 182 is coupled via the capacitor 184 to ground. The vacuum tube 160 also includes the suppressor grid 166 which is connected to ground, the screen grid 168 which is connected to the positive supply bus 125 and via the capacitor 158 to ground, and the cathode 172 which is grounded.

The anode 162 of the vacuum tube 160 is also connected via the coupling capacitor 174 to the neon tube 176 which is grounded. The capacitor 180 is connected in parallel with the primary winding 182 of the transformer 183 to form the parallel tank circuit 178 which is tuned to the frequency of the carrier signal.

The full-wave rectifier 186 is connected to the secondary winding 191 having its center tap 187 connected to the negative supply bus 10. The full-wave rectifier 186 includes the pair of crystal diodes 190 and 196. The anodes 192 and 198 of the crystal diodes 190 and 196 are respectively coupled to opposite ends of the secondary winding 191 of the transformer 183, and the cathodes 194 and 200 of the crystal diodes 190 and 196 are interconnected.

The full-wave rectifier 188 is connected to the secondary winding 193 having its center tap 189 connected to the positive supply bus 5.

The full-wave rectifier 188 includes the pair of crystal diodes 202 and 208. The cathodes 204 and 210 of the crystal diodes 202 and 208 are coupled to opposite ends of the secondary winding 193, and the anodes 206 and 212 of the crystal diodes 202 and 208 are connected together.

The filter 220 which couples the cathodes 194 and 200 of the crystal diodes 190 and 196 to the positive output terminal 236 is a parallel tank circuit which includes the capacitor 224 and the inductor 222. The capacitor 226 connects the positive output terminal 236 to the negative supply bus 10. The positive output terminals 236 is also coupled via the resistor 230 to the negative supply bus 70.

The filter 214, which couples the anodes 206 and 212 of the crystal diodes 202 and 208 to the negative output terminal 238, is a parallel tank circuit which includes the capacitor 218 and the inductor 216. The capacitor 228 connects the negative output terminal 238 to the positive supply bus 5. The negative output terminal 238 is also coupled by the resistor 234 to the positive supply bus 65.

Initially, the crystal diodes 190 and 196 are in a conductive state such that the potential at the positive output terminal 236 is approximately minus ten volts. Similarly, the crystal diodes 202 and 208 are initially in a conductive state such that the potential at the negative output terminal 238 is approximately plus five volts.

When a signal is fed to the input terminal 150 it is combined with the one megacycle carrier and fed to the buffer 156. As previously noted, one input terminal of the buffer 156 is connected to a negative five volts supply bus so that all signals at the output of gate 156 which are equal to or more positive than minus five volts will be passed by the buffer 156. A signal passed by the buffer 156 is applied to the control grid 170 of the vacuum tube 160. The signal is amplified by vacuum tube 160 and appears across the parallel tank circuit 178. The parallel tank circuit 178 is tuned to the frequency of the incoming signal so that the maximum signal will be passed by the parallel tank circuit 178 to the full-wave rectifiers 186 and 188.

The full-wave rectifier 186 delivers a positive signal which is then filtered by the filter 220 to appear as a positive direct-current potential of approximately five volts at the positive output terminal 236. The full-wave rectifier 188 delivers a negative signal which is then filtered by the filter 214 to appear as a negative direct-current potential of approximately ten volts at the negative output terminal 238.

Thus, if a positive signal is present at the input terminal 150, the voltage at the positive output terminal 236 is plus five volts, and the potential at the negative output terminal 238 is minus ten volts. However, if no signal is present at the input terminal 150, the voltage at the positive output terminal 236 will be minus ten volts, and the potential at the negative output terminal 238 will be plus five volts.

Generally, it should be noted that this D.-C. amplifier is a carirer type D.-C. amplifier with positive and negative output signals comprising only one vacuum tube and producing output signals equal in magnitude to the input signals. It should also be noted that the D.-C. amplifier includes a transformer and rectifiers for producing output signals of the desired magnitude from a low impedance source, the D.-C. amplifier thereby being especially adaptable for use in conjunction with networks of crystal diodes.

Flip flop

A flip flop of the type used in the comparators is a bistable electronic circuit with two output terminals, one of which is maintained at one potential level and the other of which is maintained at a second potential level to indicate one stable state. Upon receipt of a signal of suitable magnitude at its input the potential levels of the two output terminals are interchanged to indicate a second stable state.

The symbol for a representative flip flop 240 is illustrated in Fig. 11. The flip flop 240 comprises the input terminal 242, two reset terminals 251, 253, positive output terminal 254, and negative output terminal 256.

One stable state of the flip flop 240 is the normal condition which is designated "reset" and exists when a negative potential of ten volts appears at the positive output terminal 254 and a positive potential of five volts appears at the negative output terminal 256. The second stable state is designated "set" and exists when a positive potential of five volts appears at the positive output terminal 254 and a negative potential of ten volts appears at the negative output terminal 256.

The flip flop 240 is set when a positive input signal is received via its input terminal 242, and this is true irrespective of any reset signal which may simultaneously be transmitted to the reset terminals 251 or 253 of the flip flop 240.

Once set, the flip flop remains set as long as positive signals are received via the reset terminal 251 even though the "setting" pulse or signal has terminated. When the signal received via a reset terminal such as 251 becomes negative, the flip flop 240 is reset unless a positive pulse or signal is simultaneously being received via the input terminal 242.

Stated more generally, the flip flop 240 is set by the receipt of a positive input signal via the input terminal 242 and is reset by a coincidence of a negative input signal and at least one reset signal. After being reset, the flip flop 240 remains reset until the above recited set conditions are fulfilled.

The detailed circuitry of the flip flop 240 is illustrated in Fig. 12 employing some of the logical symbols previously described.

The flip flop 240 comprises the buffer 246, the D.-C. amplifier 252 and the gate 248.

The input terminal 242 is the input terminal of the buffer 246. A positive signal which is transmitted to the input terminal 242 is passed through the buffer 246 to the D.-C. amplifier 252, and causes the D.-C. amplifier 252 to generate a positive potential of five volts at its positive output terminal 254 and a negative potential of ten volts at its negative output terminal 256.

The gate 248 couples the positive output terminal 254 of the D.-C. amplifier 252 to the buffer 246. When a positive signal is present at the reset terminals 251 and 253, the gate 248 passes the positive signal to the buffer 246. Thus a feedback path is provided which enables the positive potential of five volts to be maintained at the positive output terminal 254 and which is blocked only when a negative signal causes the gate 248 to be blocked.

It should be noted that a reset signal which causes the gate 248 to be blocked will not prevent a set signal at the buffer 246 from causing the D.-C. amplifier 252 to generate a positive potential of five volts at its positive output terminal 254 during the existence of the set signal.

*Pulse amplifier*

The symbol for a representative pulse amplifier is shown in Fig. 13. When a positive pulse is fed to the pulse amplifier 90 via the input terminal 92, the pulse amplifier 90 functions to transmit a positive pulse which swings from minus ten to plus five volts from its positive output terminal 124, and a negative pulse which swings from plus five to minus ten volts from its negative output terminal 126. At all other times, the pulse amplifier 90 has a negative potential of ten volts at its positive output terminal 124 and a positive potential of five volts at its negative output terminal 126.

The detailed circuitry of the pulse amplifier 90 is shown in Fig. 14. The pulse amplifier 90 includes the vacuum tube 108, the pulse transformer 116 and associated circuitry. The vacuum tube 108 comprises the cathode 114, the grid 112 and the anode 110. The pulse transformer comprises the primary winding 118 and the secondary windings 120 and 122.

The crystal diode 94 couples the grid 112 of the vacuum tube 108 to the input terminal 92, the anode 96 of the crystal diode 94 being coupled to the input terminal 92, and the cathode 98 being coupled to the grid 112. The negative supply bus 70 is coupled to the grid 112 via the resistor 100 and tends to make the crystal diode 94 conductive. The grid 112 and the cathode 98 of the crystal diode 94 are also coupled to the cathode 104 of the crystal diode 102, whose anode 106 is coupled to the negative supply bus 5. The crystal diode 102 clamps the grid 112 at a potential of minus five volts thus preventing the voltage applied to the grid 112 from becoming more negative than minus five volts.

When a voltage more positive than minus five volts is transmitted to the input terminal 92, the crystal diode 94 conducts and the voltage is applied to the grid 112. Since the crystal diode 102 clamps the grid 112 and the cathode 98 of the crystal diode 94 at minus five volts, any voltage more negative than minus five volts will cause the crystal diode 94 to become nonconductive, and that input voltage will be blocked at the crystal diode 94. Thus, the clamping action of the crystal diode 102 will not affect the circuitry which supplies the input voltage.

The cathode 114 of the vacuum tube 108 is connected to ground potential. The anode 110 of the vacuum tube 108 is coupled by the primary winding 118 of the pulse transformer 116 to the positive supply bus 250. The outer ends of the secondary windings 120 and 122 of the pulse transformer 116 are coupled respectively to the positive output terminal 124 and the negative output terminal 126. The inner ends of the secondary windings 120 and 122 are coupled respectively to the negative supply bus 10 and the positive supply bus 5.

A positive pulse which is fed to the grid 112 of the vacuum tube 108 will be inverted at the primary winding 118 of the pulse transformer 116 which is wound to produce a positive pulse in the secondary winding 120 and a negative pulse in the secondary winding 122. These pulses respectively drive the positive output terminal 124 up to a positive five volts potential and the negative output terminal 126 down to a negative ten volts potential because of the circuit parameters.

When the vacuum tube 108 is non-conducting, the negative ten volts potential is fed through the secondary winding 120 and appears at the positive output terminal 124. At the same time, the positive five volts potential is fed through the secondary winding 122 to the negative output terminal 126. These latter conditions are the normally existing conditions at the output terminals 124 and 126.

There will now be obvious to those skilled in the art many modifications and variations utilizing the principles set forth and realizing many or all of the objects and advantages of the circuits described but which do not depart essentially from the spirit of the invention.

What is claimed is:

1. Electrical apparatus for comparing first and second information items which each consist of characters sequentially arranged in order of significance, each of the characters being represented by groups of bits sequentially arranged in order of significance, the bits being represented by normally coded signals and by inversely coded signals, said electrical apparatus comprising a first gate for receiving the normally coded signals representing the first information item and the inversely coded signals representing the second information item, a second gate for receiving the normally coded signals representing the second information item and the inversely coded signals representing the first information item, said first and second gates receiving the signals in accordance with a sequential order of significance of the characters and bits, first and second bi-stable devices having set and reset conditions for indicating which of the two numbers is larger, said first bi-stable device being responsive to said first gate for being set, said second bi-stable device being responsive to said second gate for being set, a third gate responsive to said first and second bi-stable devices, means for activating said third gate following the receipt of the most significant bits of characters by said electrical apparatus, said activated third gate passing a signal when one of said first and second bi-stable devices is set, a third bi-stable device responsive to the signal passed by said activated third gate for being set, said electrical apparatus being responsive to the characters in decreasing order of significance and to the bits in increasing order of significance.

2. Electrical apparatus for comparing first and second information items which each consist of characters sequentially arranged in order of significance, each of the characters being represented by groups of bits sequentially arranged in order of significance, the bits being represented by normally coded signals and by inversely coded signals, said electrical apparatus comprising a first gate for receiving the normally coded signals representing the first information item and the inversely coded signals representing the second information item, a second gate for receiving the normally coded signals representing the second information item and the inversely coded signals representing the first information item, said first and second gates receiving the signals in accordance with a decreasing order of significance of the characters and an increasing order of significance of the bits, said first gate passing a signal when a bit of the first information item is larger than a bit of the second information item, said second gate passing a signal when a bit of the second information item is larger than a bit of the first information item, first and second bi-stable devices having set and reset conditions for indicating which of the two numbers is larger, said first bi-stable device being responsive to said first gate for being set, said second bi-stable device being responsive to said second gate for being set, a third gate responsive to said first and second bi-stable devices, means for activating said third gate following the receipt of the most significant bits of characters by said electrical apparatus, said activated third gate passing a signal when one of said first and second bi-stable devices is set, a third bi-stable device responsive to the signal passed by said activated third gate for being set, said first and second gates being responsive to said set third bi-stable device for ceasing to pass signals.

3. Electrical apparatus for comparing first and second information items which each consist of characters sequentially arranged in order of significance, each of the characters being represented by groups of bits sequentially arranged in order of significance, the bits being represented by normally coded signals and by inversely coded signals, said electrical apparatus comprising a first gate for receiving the normally coded signals representing the first information item and the inversely coded signals representing the second information item, a second gate for receiving the normally coded signals representing the second information item and the inversely coded signals representing the first information item, said first and second gates receiving the signals in accordance with a decreasing order of significance of the characters and an increasing order of significance of the bits, said first gate passing a signal when a bit of the first information item is larger than a bit of the second information item, said second gate passing a signal when a bit of the second information item is larger than a bit of the first information item, first and second bi-stable devices having set and reset conditions for indicating which of the two numbers is larger, said first bi-stable device being responsive to said first gate for being set, said second bi-stable device being responsive to said second gate for being set, a third gate responsive to said first and second bi-stable devices, means for activating said third gate following the receipt of the most significant bits of characters by said electrical apparatus, said activated third gate passing a signal when one of said first and second bi-stable devices is set, a third bi-stable device responsive to the signal passed by said activated third gate for being set, said first and second gates being responsive to said set third bi-stable device for ceasing to pass signals, and means to reset said first, second, and third bi-stable devices.

References Cited in the file of this patent

UNITED STATES PATENTS

| | | |
|---|---|---|
| 2,580,768 | Hamilton et al. | Jan. 1, 1952 |
| 2,623,171 | Woods-Hill et al. | Dec. 23, 1952 |
| 2,628,346 | Burkhart | Feb. 10, 1953 |
| 2,700,755 | Burkhart | Jan. 25, 1955 |
| 2,737,342 | Nelson | Mar. 6, 1956 |
| 2,749,440 | Cartwright | June 5, 1956 |
| 2,763,854 | Oliwa | Sept. 18, 1956 |
| 2,776,418 | Townsend | Jan. 1, 1957 |
| 2,785,856 | Hobbs | Mar. 19, 1957 |
| 2,821,696 | Shiowitz et al. | Jan. 28, 1958 |
| 2,837,732 | Nelson | June 3, 1958 |